(12) United States Patent
Balthes et al.

(10) Patent No.: US 9,482,126 B2
(45) Date of Patent: Nov. 1, 2016

(54) METHOD FOR OPERATING AN EXHAUST GAS SYSTEM OF A MOTOR VEHICLE, AND EXHAUST GAS SYSTEM FOR AN INTERNAL COMBUSTION ENGINE OF A MOTOR VEHICLE

(71) Applicant: Daimler AG, Stuttgart (DE)

(72) Inventors: Ortwin Balthes, Sachsenheim (DE); Berthold Keppeler, Owen (DE); Thorsten Woog, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/407,119

(22) PCT Filed: Feb. 28, 2013

(86) PCT No.: PCT/EP2013/000592
§ 371 (c)(1),
(2) Date: Dec. 11, 2014

(87) PCT Pub. No.: WO2013/185862
PCT Pub. Date: Dec. 19, 2013

(65) Prior Publication Data
US 2015/0176450 A1 Jun. 25, 2015

(30) Foreign Application Priority Data
Jun. 16, 2012 (DE) .................. 10 2012 012 016

(51) Int. Cl.
*F01N 3/00* (2006.01)
*F01N 3/035* (2006.01)
(Continued)

(52) U.S. Cl.
CPC ........... *F01N 3/035* (2013.01); *B01D 46/0061* (2013.01); *F01N 3/023* (2013.01); *F01N 3/103* (2013.01); *F01N 3/208* (2013.01); *F01N 9/002* (2013.01); *F01N 11/00* (2013.01); *F01N 13/02* (2013.01); *F02D 41/029* (2013.01);
(Continued)

(58) Field of Classification Search
CPC ...... F02D 41/029; F01N 9/002; F01N 11/00; F01N 13/02; F01N 3/023; F01N 3/035; B01D 46/0061
USPC .......................................... 60/274
See application file for complete search history.

(56) References Cited

U.S. PATENT DOCUMENTS

| 2010/0050757 A1* | 3/2010 | Liu ................ F01N 3/106 73/114.75 |
| 2011/0047982 A1 | 3/2011 | Chen et al. |
| 2011/0167801 A1 | 7/2011 | Massner |
| 2012/0186226 A1* | 7/2012 | Ren ................ F01N 3/103 60/274 |
| 2013/0232958 A1* | 9/2013 | Ancimer ........... F01N 3/035 60/301 |

FOREIGN PATENT DOCUMENTS

DE 10 2008 027 575 A1 12/2009
EP 1 544 431 A1 6/2005
(Continued)

OTHER PUBLICATIONS

International Search Report (PCT/ISA/220 and PCT/ISA/210) dated Jul. 4, 2013 with English translation (eight pages).
(Continued)

*Primary Examiner* — Jason Shanske
(74) *Attorney, Agent, or Firm* — Crowell & Moring LLP

(57) ABSTRACT

A method for operating an exhaust gas system of a motor vehicle involves performing regeneration of the particle filter as a function of at least one aging value characterizing an aging condition of the oxidation catalytic converter.

8 Claims, 2 Drawing Sheets

Figure 3:
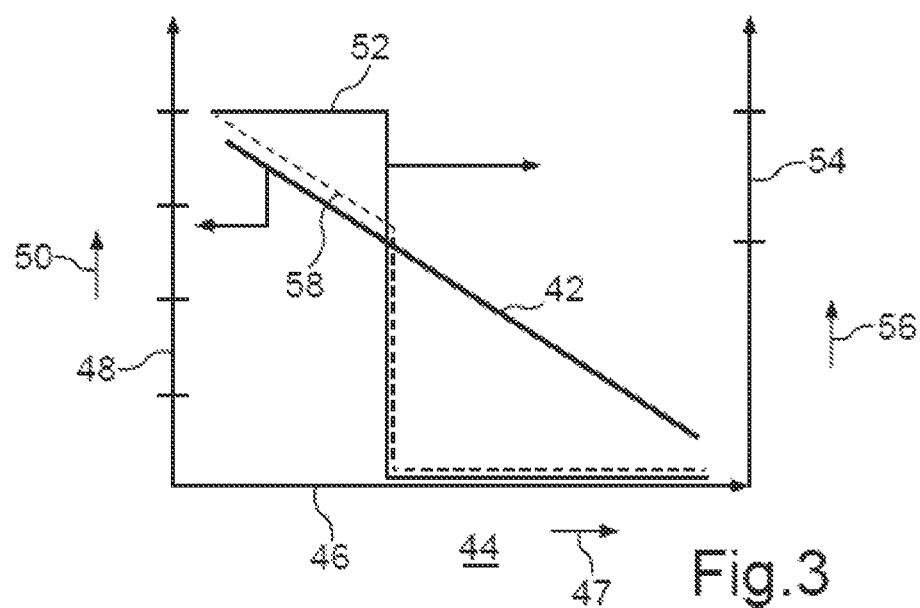

(51) Int. Cl.
- *F01N 3/10* (2006.01)
- *F02D 41/02* (2006.01)
- *F01N 9/00* (2006.01)
- *F01N 11/00* (2006.01)
- *F01N 13/02* (2010.01)
- *F01N 3/023* (2006.01)
- *B01D 46/00* (2006.01)
- *F01N 3/20* (2006.01)

(52) U.S. Cl.
CPC .......... *F01N3/2066* (2013.01); *F01N 2250/02* (2013.01); *F01N 2260/04* (2013.01); *F01N 2550/02* (2013.01); *F01N 2610/02* (2013.01); *F02D 2200/0812* (2013.01); *Y02T 10/47* (2013.01)

(56) References Cited

FOREIGN PATENT DOCUMENTS

| | | |
|---|---|---|
| EP | 1 669 580 A1 | 6/2006 |
| JP | 2011-185132 A | 9/2011 |
| WO | WO 2010/034403 A1 | 4/2010 |

OTHER PUBLICATIONS

German-language Written Opinion (PCT/ISA/237) dated Jul. 4, 2013 (six pages).

\* cited by examiner

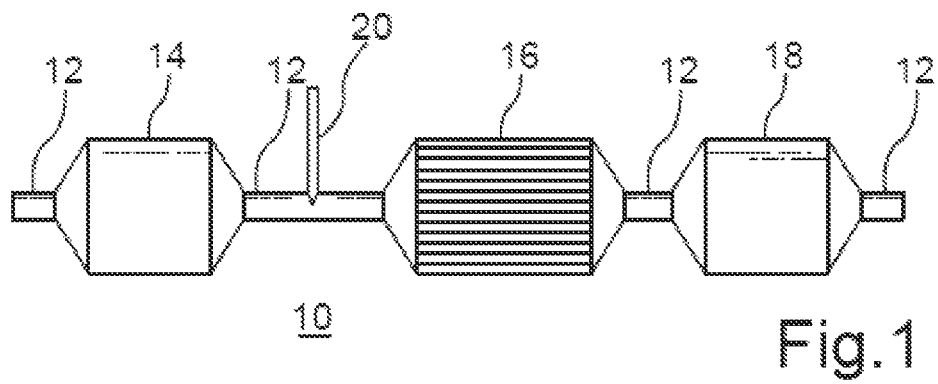
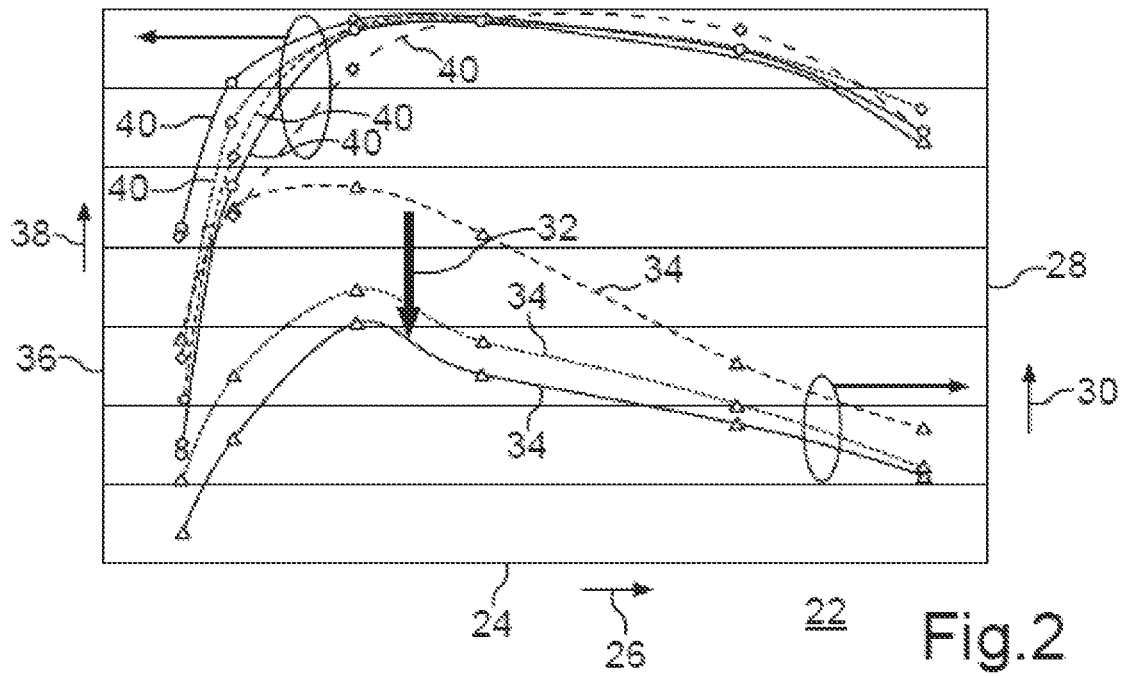

METHOD FOR OPERATING AN EXHAUST GAS SYSTEM OF A MOTOR VEHICLE, AND EXHAUST GAS SYSTEM FOR AN INTERNAL COMBUSTION ENGINE OF A MOTOR VEHICLE

BACKGROUND AND SUMMARY OF THE INVENTION

Exemplary embodiments of the invention relate to a method for operating an exhaust gas system of a motor vehicle and an exhaust gas system for an internal combustion engine of a motor vehicle.

Methods and exhaust gas systems are generally well known from the serial production of motor vehicles. Exhaust gas from the internal combustion engine may flow through such an exhaust gas system for an internal combustion engine of a motor vehicle, which includes at least one oxidation catalytic converter and at least one particle filter situated downstream from the oxidation catalytic converter in the direction of flow of the exhaust gas. The oxidation catalytic converter is used for oxidizing constituents of the exhaust gas, in particular for oxidizing uncombusted hydrocarbons and carbon monoxide in the exhaust gas. Nitric oxide in the exhaust gas may also be oxidized by the oxidation catalytic converter. The particle filter is used for at least partially filtering from the exhaust gas particles, in particular soot particles, contained in the exhaust gas.

Due to the filtering of the particles from the exhaust gas, the particle filter becomes occupied with particles, which is customarily referred to as loading of the particle filter. As the result of filtering the particles, the loading of the particle filter with particles from the exhaust gas increases, which is accompanied by a rising exhaust gas back pressure for the internal combustion engine. To minimize the exhaust gas back pressure, and thus, the accompanying disadvantages, it is known to reduce the loading of the particle filter by carrying out a so-called regeneration of the particle filter. For this purpose, the temperature of the exhaust gas is increased by appropriate measures, for example, so that the particles in the particle filter are burned off. For carrying out the regeneration, a control device, for example, is provided by means of which the regeneration is to be performed in a controlled or regulated manner. In other words, the control device is used to control or regulate, and thus carry out, the regeneration.

It has been shown that such methods and such exhaust gas systems have additional potential for further reducing pollutants contained in the exhaust gas, and thus pollutant emissions, by appropriate exhaust gas aftertreatment.

Exemplary embodiments of the present invention, therefore, are directed to an improved method and exhaust gas system that achieves a particularly low pollutant emissions.

According to the invention the regeneration of the particle filter is carried out as a function of at least one aging value characterizing an aging condition of the oxidation catalytic converter. The loading of the particle filter may thus be adapted to the aging condition of the oxidation catalytic converter, by means of which the behavior of the particle filter or its contribution to the aftertreatment of the exhaust gas from the internal combustion engine is adapted to the aging condition. It is thus possible to appropriately adapt and adjust the exhaust gas with regard to its composition or its constituents downstream from the particle filter, so that its composition is favorable, for example, for any further aftertreatment by means of at least one exhaust gas aftertreatment element situated downstream from the particle filter.

The aftertreatment of the exhaust gas achieved by the particle filter has a particularly advantageous effect on the composition of the exhaust gas when, as the result of carrying out the regeneration as a function of the aging value, a loading value that characterizes the loading of the particle filter is set that is greater than a predefinable threshold value. The threshold value is not negative, and preferably is greater than 0.

In another advantageous embodiment of the invention, as the threshold value a constant threshold value is used that is in a range of 1 gram of particles per liter of filter volume of the particle filter up to and including 3 grams of particles per liter of filter volume of the particle filter. The loading of the particle filter has a particularly advantageous effect on the aftertreatment of the exhaust gas by the particle filter, and thus on the composition of the exhaust gas, when the predefinable threshold value is at least essentially 1.5 grams of particles per liter of filter volume of the particle filter. The level of effort for the measurement and/or the computation for carrying out the method may be kept low by using the constant threshold value.

It has been shown to be particularly advantageous when, as the threshold value, a variable threshold value is used that is predefined as a function of the aging condition of the oxidation catalytic converter, in particular as a function of the aging value. In other words, the variable threshold value is dynamically adapted to the aging condition, which changes over the operating life, so that as a result, the loading of the particle filter may also be precisely adapted to the aging condition as needed.

In another advantageous embodiment of the invention, the variable threshold value is predefined from a range of 1 gram of particles per liter of filter volume of the particle filter up to and including 3 grams of particles per liter of filter volume of the particle filter. In this range, the composition of the exhaust gas is influenced in a particularly advantageous manner by the exhaust gas aftertreatment achieved by the particle filter.

One variable that is particularly meaningful and that precisely represents the aging condition of the oxidation catalytic converter is a thermal load on the oxidation catalytic converter within a predefinable time period. In other words, a load value characterizing the thermal load on the oxidation catalytic converter within the predefinable time period is used as the aging value characterizing the aging condition of the oxidation catalytic converter. Alternatively or additionally, an activity value characterizing an activity, associated with the oxidation catalytic converter, for forming nitrogen dioxide in the exhaust gas is used as the aging value characterizing the aging condition. In addition, conclusions may also thus be drawn in a particularly precise manner concerning the aging condition of the oxidation catalytic converter, and thus its capability or tendency to form nitrogen dioxide in the exhaust gas. The loading of the particle filter, and thus its behavior with regard to the exhaust gas aftertreatment, may thus be precisely adapted to the aging condition.

The activity value is preferably determined as a function of a nitrogen dioxide component in the exhaust gas, downstream from the oxidation catalytic converter and upstream from the particle filter, which is achieved by the oxidation catalytic converter. It is thus possible to precisely determine the activity of the oxidation catalytic converter with regard to the formation of nitrogen dioxide, and thus to draw conclusions concerning its aging condition.

In one particularly advantageous embodiment of the invention, a particle filter is used that is at least partially provided with a coating that is active for a selective catalytic reduction reaction of nitrogen oxides in the exhaust gas. It has surprisingly been found that a particle filter which is loaded with particles or soot and at least partially provided with the mentioned coating (selective catalytic reduction (SCR) coating), with an appropriate particle loading and an appropriate temperature range, has an improved conversion of nitrogen oxides in the exhaust gas in order to denox the exhaust gas when there is a comparatively high concentration of nitrogen dioxide in the exhaust gas, compared to a particle filter which is not loaded with particles.

In other words, compared to a particle filter that is not loaded with particles and provided with the SCR coating, the particle filter that is loaded with particles and provided with the SCR coating is able to make a greater contribution to denoxification of the exhaust gas, i.e., for converting nitrogen oxides into nitrogen and water, so that pollutant emissions may be kept particularly low. In addition, it is thus possible to supply the exhaust gas aftertreatment element, possibly situated downstream from the particle filter, with an advantageous nitric oxide component in the exhaust gas, and in particular with an advantageous ratio of nitrogen dioxide to nitric oxide in the exhaust gas, so that, for example, particularly advantageous further denoxification of the exhaust gas may take place by means of the downstream exhaust gas aftertreatment element. The downstream exhaust gas aftertreatment element is preferably an SCR catalytic converter, by means of which the exhaust gas is to be denoxed by carrying out the selective catalytic reduction reaction.

The second aspect of the invention relates to an exhaust gas system for achieving particularly low pollutant emissions, which includes a control device designed to carry out the regeneration of the particle filter as a function of at least one aging value characterizing an aging condition of the oxidation catalytic converter. Advantageous embodiments of the method according to the invention are to be regarded as advantageous embodiments of the exhaust gas system according to the invention, and vice versa.

The pollutant emissions may be kept particularly low when the particle filter is at least partially provided with a coating that is active for a selective catalytic reduction reaction of nitrogen oxides in the exhaust gas, and/or when a catalytic converter for carrying out a selective catalytic reduction reaction of nitrogen oxides in the exhaust gas is situated downstream from the particle filter, a metering device being situated downstream from the oxidation catalytic converter and upstream from the particle filter, by means of which a reducing agent for the selective catalytic reduction reaction is introducible into the exhaust gas.

The reducing agent is an aqueous urea solution in particular. The reducing agent is an ammonia source by means of which, for example in the particle filter provided with the SCR coating and in particular in the SCR catalytic converter, nitrogen oxides are convertible into water and nitrogen, thus denoxing the exhaust gas.

Further advantages, features, and particulars of the invention result from the following description of preferred exemplary embodiments and with reference to the drawings. The features and feature combinations mentioned above in the description as well as the features and feature combinations mentioned below in the description of the figures and/or only shown in the figures may be used not only in the particular stated combination, but also in other combinations or alone without departing from the scope of the invention.

BRIEF DESCRIPTION OF THE DRAWING FIGURES

The figures show the following:

FIG. 1 shows a schematic illustration of an exhaust gas system for an internal combustion engine of a motor vehicle, having an oxidation catalytic converter and a particle filter which is regenerated as a function of at least one aging value which characterizes an aging condition of the oxidation catalytic converter;

FIG. 2 shows a diagram for illustrating an activity, associated with the oxidation catalytic converter, for forming nitrogen dioxide in the exhaust gas by oxidation of nitric oxide, and for illustrating a capability of the particle filter for reacting nitrogen oxides by carrying out a selective catalytic reduction reaction and converting them into nitrogen and water; and FIG. 3 shows a diagram for illustrating the carrying out of the regeneration of the particle filter as a function of the aging condition of the oxidation catalytic converter.

DETAILED DESCRIPTION

FIG. 1 shows an exhaust gas system 10 for an internal combustion engine of a motor vehicle, which is designed as a reciprocating piston internal combustion engine, for example. Exhaust gas from the internal combustion engine may flow through the exhaust gas system 10. The exhaust gas system 10 includes exhaust gas pipes 12 for conducting the exhaust gas, via which the exhaust gas from the internal combustion engine is suppliable to and dischargeable from the exhaust gas aftertreatment elements of the exhaust gas system 10. The exhaust gas system 10 includes an oxidation catalytic converter 14 as the first exhaust gas aftertreatment element. As the second exhaust gas aftertreatment element, the exhaust gas system 10 includes a particle filter 16 situated downstream from the oxidation catalytic converter 14 in the direction of flow of the exhaust gas through the exhaust gas system 10. As the third exhaust gas aftertreatment element, the exhaust gas system 10 includes a so-called SCR catalytic converter 18 situated downstream from the particle filter 16. The oxidation catalytic converter 14 is used to oxidize uncombusted hydrocarbons (HC) and carbon monoxide (CO). Nitric oxide (NO) in the exhaust gas may also be oxidized to nitrogen dioxide ($NO_2$) by means of the oxidation catalytic converter 14.

The internal combustion engine may be designed as a diesel engine. The oxidation catalytic converter 14 is customarily referred to as a diesel oxidation catalytic converter (DOC), while the particle filter 16 is referred to as a diesel particle filter.

The particle filter 16 is used to filter particles, in particular soot particles, from the exhaust gas. The selective catalytic reduction (SCR) catalytic converter 18 is used for carrying out a selective catalytic reduction reaction via which nitrogen oxides ($NO_x$, in particular NO and $NO_2$) are reduced and converted to nitrogen ($N_2$) and water ($H_2O$), using ammonia from an ammonia source. The exhaust gas is denoxed in this way.

A reducing agent, for example in the form of an aqueous urea solution, is used as the ammonia source. For introducing the reducing agent into the exhaust gas, a metering device 20 of the exhaust gas system 10, by means of which the reducing agent is metered into the exhaust gas, is situated downstream from the oxidation catalytic converter 14 and upstream from the upstream from the particle filter 16.

The particle filter 16 is at least partially provided with a coating that is active for the selective catalytic reduction reaction of nitrogen oxides in the exhaust gas. The SCR catalytic converter 18 is also provided with such a coating that is active for the selective catalytic reduction reaction of nitrogen oxides in the exhaust gas. As a result of providing the particle filter 16 with the mentioned coating, referred to as an SCR coating, the particle filter 16 is also able to react nitrogen oxides in the exhaust gas, and within the scope of the selective catalytic reduction reaction, to convert them into nitrogen and water and denox the exhaust gas. In other words, the particle filter 16 also has a so called conversion capability or conversion performance for converting nitrogen oxides into nitrogen and water. Therefore, the particle filter 16 is also referred to as an SDPF (DPF—diesel particle filter), where the S in the term "SDPF" indicates the conversion capability, i.e., the ability to carry out the selective catalytic reduction reaction.

With increasing operating time, during which the particle filter 16 filters particles from the exhaust gas, the particle filter 16 becomes filled with particles. This is customarily referred to as loading of the particle filter 16. An exhaust gas back pressure for the internal combustion engine rises with increasing loading of the particle filter 16 with particles from the exhaust gas. In order to now keep the exhaust gas back pressure low and thus avoid accompanying problems, a so-called regeneration of the particle filter 16 is carried out to reduce the loading of the particle filter 16. For this purpose, for example the temperature of the exhaust gas flowing through the exhaust gas system 10 is raised, so that the particles in the particle filter 16 are burned off.

A control device in the form of a control unit of the internal combustion engine is associated with the exhaust gas system 10, and is designed for carrying out the regeneration. In other words, the control unit is designed for regulating or controlling the regeneration.

The capability of the oxidation catalytic converter 14 to oxidize nitric oxide in the exhaust gas to nitrogen dioxide is a function of the aging condition of the oxidation catalytic converter. The aging condition refers to a thermal load on the oxidation catalytic converter 14 within a predefinable time period. In other words, during operation of the internal combustion engine, the oxidation catalytic converter 14 is acted on and stressed by temperatures in particular via the exhaust gas, so that the oxidation catalytic converter 14 ages as the operating time increases. In the process, the capability, i.e., an oxidation activity, associated with the oxidation catalytic converter 14, for oxidizing nitric oxide to nitrogen dioxide, decreases with increasing age, i.e., with an increasing aging condition.

Within the scope of a method for operating the exhaust gas system 10, it is now advantageously provided that the regeneration of the particle filter is carried out as a function of at least one aging value which characterizes the aging condition of the oxidation catalytic converter 14. This means that the control unit is appropriately designed to carry out the regeneration of the particle filter as a function of the aging value.

With a comparatively low aging condition of the oxidation catalytic converter 14 and a corresponding comparatively high oxidation activity of the oxidation catalytic converter 14, in particular when a nitrogen dioxide component in the exhaust gas reaches greater than 50% in a temperature range of the exhaust gas from 170° C. up to and including 300° C., the mandatory regeneration of the particle filter 16 by thermal burnoff of the particles is thus carried out in such a way that a residual particle loading of the particle filter 16 remains that preferably is not below a predefinable upper limit value.

By carrying out the regeneration as a function of the aging value, a loading value characterizing the loading of the particle filter is set that is greater than a predefinable positive threshold value that is different from 0 and that forms the limit value. The limit value (threshold value) may be formed as a predefinable, aging-dependent (until a definable limiting aging of the oxidation catalytic converter 14 is reached), fixed, i.e., constant, limit value of preferably at least essentially 1.5 grams of particles per liter of filter volume of the particle filter 16 or as an aging-dependent variable limit value (threshold value).

This carrying out of the regeneration is based on the following finding: SCR catalytic converters generally have a maximum catalytic activity, with regard to the $NO_x$ reduction with ammonia as reducing agent, at an $NO_2/NO$ ratio of 1:1, i.e., for an $NO_2$ component of approximately 50% in the exhaust gas. The $NO_2$ component in the uncontrolled exhaust gas, which is typically much lower, is increased by means of the oxidation catalytic converter 14. However, the oxidation activity of the oxidation catalytic converter 14 typically decreases with increasing aging, as is apparent from FIG. 2.

FIG. 2 shows a diagram 22 in which the temperature of the exhaust gas upstream from the particle filter 16 is progressively plotted on the abscissa 24 according to a directional arrow 26. The ratio of $NO_2$ to $NO_x$, expressed in percent, downstream from the particle filter 16 is progressively plotted on a first ordinate 28 of the diagram 22 according to a directional arrow 30. The oxidation activity decreases with increasing aging, as indicated by a directional arrow 32. Curves 34 illustrate the decreasing oxidation activity with increasing aging as a function of temperature.

However, the aim is that the $NO_2$ component does not drop greatly below 50%, even after aging of the oxidation catalytic converter 14 in a temperature range of the exhaust gas of 170° C. up to and including 300° C. This in turn means that a coating of the oxidation catalytic converter 14 that is catalytically active for the oxidation is to be selected in such a way that even in the thermally aged state, the $NO_2$ component is sufficiently high, and, for example, greater than 20% and preferably greater than 40%. However, this may result in undesirably high $NO_2$ components of, for example, greater than 50% in the unaged state of the oxidation catalytic converter 14. Namely, unaged oxidation components for oxidizing exhaust gas constituents show very strong activity with regard to $NO_2$ formation by oxidation of NO contained in the exhaust gas, primarily in the temperature range of 170° C. up to and including 300° C. Exhaust gas systems in the temperature range of 170° C. to 300° C. that are not aged or only slightly aged typically show $NO_2$ concentrations of greater than 50% downstream from the oxidation catalytic converter 14. The oxidation catalytic converter 14 may also be formed by a particle filter, in particular a diesel particle filter, which is coated with oxidation catalyst, referred to as a cDPF.

However, if the $NO_2$ component of the $NO_x$ contained in the exhaust gas is greater than 50%, this has negative effects on the downstream SCR catalytic converter 18 with regard to its reduction performance, i.e., its performance in carrying out the selective catalytic reduction reaction, by means of which $NO_x$ is reduced and the exhaust gas is denoxed. In addition, for high $NO_2$ concentrations upstream from the particle filter 16, the risk of greater $NH_4NO_3$ formation at the particle filter 16 increases. Thus, on the one hand, an activity associated with the SCR catalytic converter 18 with regard to its capability of reacting nitrogen oxides and converting them into nitrogen and water may be additionally decreased. On the other hand, the risk of increased $N_2O$ emissions downstream from the particle filter 16, resulting from decomposition of $NH_4NO_3$, increases.

It has now surprisingly been found that the particle filter 16, which is loaded with particles or soot and provided with the SCR coating, in particular with a soot or particle loading in a range of 1.5 grams of particles per liter of filter volume up to and including 8 grams of particles per liter of filter volume, and in particular in a range of 3 grams of particles per liter of filter volume up to and including 6 grams of particles per liter of filter volume, in a temperature range from 170° C. up to and including 300° C., in particular in a temperature range of 200° C. up to and including 250° C., has improved $NO_x$ conversion performance at comparatively high $NO_2$ concentrations of greater than 50%, preferably greater than 60%, compared to a particle filter which is not loaded with particles or soot. This is apparent from FIG. 2. The $NO_x$ conversion, expressed in percent, at the particle filter 16 is progressively plotted on a second ordinate 36 according to a directional arrow 38.

Curves 40 in the diagram 22 illustrate the conversion capability of the particle filter 16 as a function of the temperature, the particle loading of the particle filter, and the $NO_2$ concentration; the dashed-line curves provided with diamond-shaped symbols refer to the unloaded particle filter 16, while the solid-line curves 40 provided with dot-shaped symbols and diamond-shaped symbols refer to the particle filter 16 which is loaded, for example, with 6 grams of particles per liter of filter volume.

Use is made of this described effect by storing, for example, the aging condition of the $NO_2$-forming component in the form of the oxidation catalytic converter 14 by means of a characteristic curve 42, illustrated in FIG. 3, in the control unit. FIG. 3 shows another diagram 44 in which aging, i.e., time, is progressively plotted on the abscissa 46 according to a directional arrow 47. The $NO_2$ component, expressed in percent, downstream from the oxidation catalytic converter 14 at 250° C. is progressively plotted on a first ordinate 48 of the diagram 44 according to a directional arrow 50.

The respective aging condition for a particular operating point may then be associated with an $NO_2$ formation rate at the oxidation catalytic converter 14. In the unaged state, i.e., with little thermal stress, there is a tendency toward excessive formation of $NO_2$ at the oxidation catalytic converter 14 in the temperature range of 170° C. to 300° C., the $NO_2$ component being greater than 50%, for example. To compensate for the associated decrease in the $NO_x$ conversion at the particle filter 16, within the scope of the regeneration the particle filter 16 is not completely regenerated, but, rather, is regenerated to a specific residual particle loading, i.e., to the predefinable limit value. The $NO_x$ conversion activity of the particle filter 16 and of the downstream SCR catalytic converter 18 is thus temporally stabilized, regardless of the aging condition of the oxidation catalytic converter 14. At the same time, the risk of formation of $NH_4NO_3$ is reduced. In addition, the duration of the regeneration is decreased.

Above a predefinable aging, i.e., above a predefinable aging coefficient, the residual particle loading may be determined, for example, via an integral over time of the thermal load on the oxidation catalytic converter 14, or above an $NO_2$ formation of greater than 50% at 250° C. and with an average exhaust gas throughput, is greater than 1.5 grams per liter of filter volume. In other words, 1.5 grams of particles per liter of filter volume is used as the above-described aging-dependent, fixed limit value.

Alternatively, a residual soot loading that correlates with the aging condition and that continuously decreases with an increasing aging condition, for example, 3 grams of particles per liter of filter volume in the new condition and 1.5 grams per liter of filter volume for $NO_2$ formation of approximately 50%, may be provided. This is illustrated with reference to a first curve 52 in FIG. 3. The first curve 52 relates to a second ordinate 54 of the diagram 44 on which the loading, i.e., the residual particle loading, of the particle filter 16, expressed in units of particles per liter of filter volume, is progressively plotted according to a directional arrow 56. If the oxidation catalytic converter 14 is unaged or only slightly aged, the oxidation catalytic converter 14 thus has an at least essentially new condition, and the particle filter 16 is therefore regenerated only to a residual particle loading of at least essentially 3 grams of particles per liter of filter volume. If the oxidation catalytic converter 14 has a corresponding aging condition, it is regenerated to a residual particle loading of at least essentially 1.5 grams of particles per liter of filter volume. As illustrated by a second curve 58, with an increasing aging condition, essentially continuously decreasing residual particle loading, beginning, for example, at 3 grams of particles per liter of filter volume in the new condition to 1.5 grams of particles per liter of filter volume for an $NO_2$ formation of approximately 50%, may be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating an exhaust gas system of a motor vehicle, the method comprising:
   passing exhaust gas from an internal combustion engine through an oxidation catalytic converter and a particle filter situated downstream from the oxidation catalytic converter in a direction of flow of the exhaust gas, wherein the particle filter is at least partially provided with a coating that is active for a selective catalytic reduction reaction of nitrogen oxides in the exhaust gas; and
   regenerating the particle filter to reduce a loading of the particle filter with particles filtered from the exhaust gas,
   wherein the regeneration of the particle filter is performed as a function of an aging value characterizing an aging condition of the oxidation catalytic converter in such a way that a residual particle loading remains in the particle filter, wherein the residual particle loading corresponds to a loading value greater than a threshold value that is predefined as a function of the aging value.

2. The method of claim 1, wherein above a predefined aging value a constant threshold value is used as the threshold value, wherein the constant threshold value is in a range of 1 gram of particles per liter of filter volume of the particle filter up to and including 3 grams of particles per liter of filter volume of the particle filter.

3. The method of claim 1, wherein a variable threshold value is used as the threshold value, wherein the variable threshold value is predefined as a function of the aging value.

4. The method of claim 3, wherein the variable threshold value is predefined from a range of 1 gram of particles per liter of filter volume of the particle filter up to and including 3 grams of particles per liter of filter volume of the particle filter.

5. The method of claim 1, wherein the aging value characterizing the aging condition of the oxidation catalytic converter is
a load value characterizing a thermal load on the oxidation catalytic converter within a predefined time period, or
an activity value characterizing an activity associated with the oxidation catalytic converter for forming nitrogen dioxide in the exhaust gas.

6. The method of claim 5, wherein the activity value is determined as a function of a nitrogen dioxide fraction in the exhaust gas, downstream from the oxidation catalytic converter and upstream from the particle filter, which is achieved by the oxidation catalytic converter.

7. An exhaust gas system for an internal combustion engine of a motor vehicle, through which exhaust gas from the internal
combustion engine may flow, the system comprising: an oxidation catalytic converter; a particle filter situated downstream from the oxidation catalytic converter in a direction of flow of the exhaust gas, wherein the particle filter is at least partially provided with a coating that is active for a selective catalytic reduction reaction of nitrogen oxides in the exhaust gas;
an SCR catalytic converter situated downstream from the particle filter; and
an electronic control unit configured to perform a regeneration of the particle filter in order to reduce a loading of the particle filter with particles filtered from the exhaust gas, wherein the electronic control unit is configured to perform the regeneration of the particle filter as a function of at least one aging value characterizing an aging condition of the oxidation catalytic converter in such a way that a residual particle loading remains in the particle filter, the residual particle loading corresponding to a loading value which is greater than a threshold value which is predefined as a function of the aging value.

8. The exhaust gas system of claim 7, wherein a metering device is situated downstream from the oxidation catalytic converter and upstream from the particle filter, and the metering device is configured to introduce a reducing agent for the selective catalytic reduction reaction into the exhaust gas.

* * * * *